United States Patent Office.

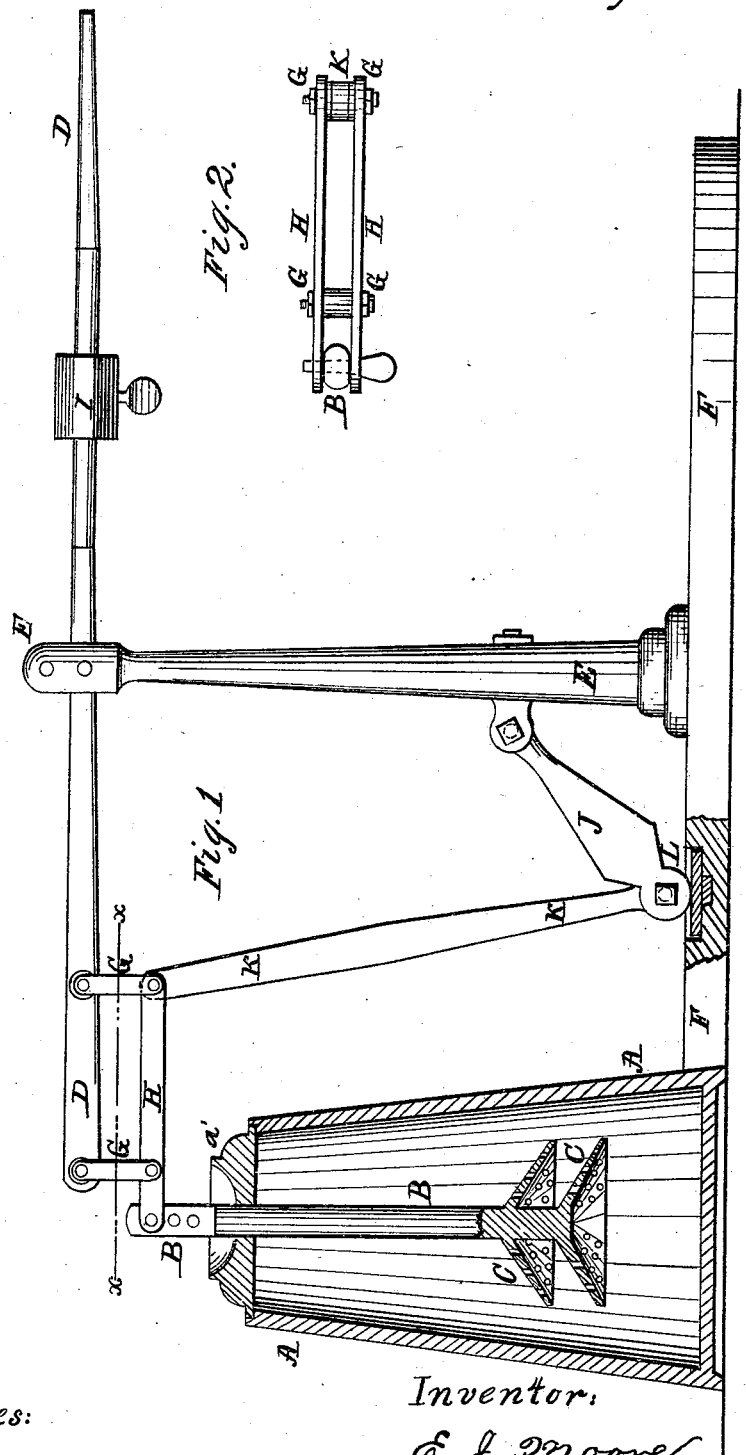

E. J. MOORE, OF WESTFIELD, NEW YORK.

Letters Patent No. 76,497, dated April 7, 1868.

IMPROVEMENT IN CHURNING-APPARATUS.

*The Schedule referred to in these Letters Patent and making part of the same.*

TO ALL WHOM IT MAY CONCERN:

Be it known that I, E. J. MOORE, of Westfield, in the county of Chautauqua, and State of New York, have invented a new and useful Improvement in Churning-Apparatus; and I do hereby declare that the following is a full, clear, and exact description thereof, which will enable those skilled in the art to make and use the same, reference being had to the accompanying drawings, forming part of this specification, in which—

Figure 1 is a side view of my improved churning-apparatus, partly in section, to show the construction.

Figure 2 is a detail sectional view of the same, taken through the line $x\ x$, fig. 1.

Similar letters of reference indicate corresponding parts.

My invention has for its object to furnish an improved apparatus for churning, so constructed and arranged that the work may be done quickly, thoroughly, and easily, a large proportion of the labor of working the dasher being performed by mechanical power.

And it consists in the construction of the dasher, and in the construction and arrangement of the parts by which said dasher is operated.

A is the churn-body, about the construction of which there is nothing new.

B is the dasher-handle, which passes down through the churn-cover $a'$, and to the lower part of which are attached two or more dashers, C.

The dashers C are made heavy, and concavo-convex in form, are attached to the lower end of the handle B, a little distance apart, and with their concave sides downward, so that they may easily pass up through the cream, the said cream readily sliding off their upper or convex sides.

The dashers C are perforated with numerous holes, so that as the said dashers descend, the milk or cream may be collected or drawn into the concavities of the dashers, and forced up through the said holes, throwing the said milk into violent agitation, and bringing the butter in a very short time.

D is a lever, adjustably pivoted to the upper end of the standard or support E, the lower end of which is securely attached to the platform or bed-plate F, as shown in fig. 1.

To each side of the forward end of the lever D are pivoted the upper ends of two pairs of short connecting-bars, G, to or between the lower ends of which are pivoted bars, H.

In the slotted forward end of the bar H, when one bar is used, or in the space between the forward ends of the bars H, when two bars are used, is pivoted the upper end of the dasher-handle B, by a pin passing through the end of the bar or bars H, and through one or the other of the holes formed through the upper part of the said dasher-handle B, so that the dasher may be adjusted according to the height of the churn or the amount of cream to be churned at a time.

By this arrangement of the bars G and H, lever D, and dasher-handle B, the said dasher-handle B will move up and down vertically, while the forward end of the lever D is moving through an arc of a circle.

I is a balance-weight, adjustably attached to the free end or handle of the lever D, so that by adjusting the position of the said weight, the said lever may be made to work with the desired ease.

The weight I may be secured in place, when adjusted, by a set of screws, as shown in fig. 1.

J is a weighted lever, the rear end of which is pivoted to a stationary standard or support, or to the standard E, as shown in fig. 1.

To the forward or weighted end of the lever J is pivoted the lower end of the connecting-bar K, the upper end of which is pivoted to the rear end of the bar H, or between the rear ends of the bars H when two bars are used.

L is a rubber or other elastic cushion to receive the free or weighted end of the lever J, to prevent the jar or concussion at the close of the downward movement of said lever.

As the dasher C is raised through the cream, by depressing the free end of the lever D, the weighted lever J is also raised, and by its weight, when descending, forces the said dasher down through the cream, relieving the operator from a large part of the labor of churning.

If desired, the weighted lever J may be replaced by a weight sliding up and down vertically between guides, and connected with the forward part of the lever D or bars H, by a rope passing around suitably-arranged pulleys; or it may be replaced with a balance-wheel, connected to the forward part of the lever D, by a crank and pitman.

But I prefer the construction first described, as being simpler, and more effective to accomplish the desired result.

I claim as new, and desire to secure by Letters Patent—

1. The combination of the bars G and H, adjustable lever D, and adjustable dasher-handle B with each other, substantially in the manner herein shown and described, and for the purpose set forth.

2. The combination of the adjustable balance-weight I with the lever D, substantially as herein shown and described, and for the purpose set forth.

3. The combination of the weighted lever J, or its equivalent, with the bars H or forward part of the lever D, substantially as herein shown and described, and for the purpose set forth.

E. J. MOORE.

Witnesses:
    W. S. HINKLY,
    A. H. LEITCH,
    W. S. WARD.